United States Patent [19]

Churchill et al.

[11] Patent Number: 5,139,468

[45] Date of Patent: Aug. 18, 1992

[54] TWO SPEED ENGINE ACCESSORY DRIVE WITH PLASTIC PLANET GEARS

[75] Inventors: Bruce A. Churchill, Groton; Stanley K. Dembosky, Ithaca, both of N.Y.

[73] Assignee: Borg-Warner Automotive, Inc., Sterling Heights, Mich.

[21] Appl. No.: 792,337

[22] Filed: Nov. 8, 1991

[51] Int. Cl.⁵ .............................................. F16H 3/44
[52] U.S. Cl. ................... 475/324; 475/311; 475/312; 475/323
[58] Field of Search ............... 475/311, 312, 317, 318, 475/320, 323, 324

[56] References Cited

U.S. PATENT DOCUMENTS

| | | | |
|---|---|---|---|
| 1,494,503 | 5/1924 | Rackham | 475/312 OR |
| 2,360,711 | 10/1944 | Orr | 475/324 X |
| 2,751,788 | 6/1956 | Forrest | 475/311 X |
| 4,862,770 | 9/1989 | Smith | 475/324 |
| 5,011,464 | 4/1991 | White | 475/324 X |

FOREIGN PATENT DOCUMENTS 0031646  3/1927  France .......................... 475/311

*Primary Examiner*—Rodney H. Bonck
*Assistant Examiner*—Daniel Wittels
*Attorney, Agent, or Firm*—Reising, Ethington et al.

[57] ABSTRACT

A two speed engine accessory drive including a gear case 12 and an input shaft 26 rotatable about an axis that is concentric with the central gear case axis 54. The input shaft 26 carries a drive sun gear 38. A driven sun gear 78 is positioned adjacent to the drive sun gear and is attached to an accessory drive shaft 91 that is rotatable about an axis that is concentric with the central gear case axis 54. A compound planet gear 66 is supported by a planet gear carrier 52 that is rotatable about the central gear case axis 54. The compound planet gear 66 includes a rigid insert 70, a first plastic planet gear 76 secured to the insert and in mesh with the drive sun gear 38, and a second plastic planet gear 76 secured to the insert and in mesh with the driven sun gear 78. A brake band 98 is operable to allow or prevent rotation of the planet gear carrier 52. A one way clutch is mounted in the planet gear carrier 52 and is operable to limit rotation between the planet gear carrier 52 and an accessory drive shaft 91 when the planet carrier is allowed to rotate relative to the gear case.

12 Claims, 3 Drawing Sheets

TWO SPEED ENGINE ACCESSORY DRIVE WITH PLASTIC PLANET GEARS

TECHNICAL FIELD

The invention relates to a two speed transmission for driving a vehicle internal combustion engine accessory such as an alternator, a compressor, or a pump.

BACKGROUND OF THE INVENTION

Vehicle internal combustion engines are capable of operating over a wide speed range. The range varies from a few hundred to several thousand revolutions per minute. Required engine accessories such as alternators, compressors for air conditioners and air brakes, pumps for steering systems, suspension systems, and control systems, and other accessories are most efficient if operated over a speed range that is narrower than the speed range of internal combustion engines. The problem is solved on some industrial vehicles by running the internal combustion engine at constant speed. Constant engine speed operation is only practical in vehicles that operate under a substantial load all or most of the time. A majority of vehicles operate under varying load requirements and require engines that operate over a wide speed range. Vehicle accessories are designed to provide a required output over a selected speed range. The size of any given accessory generally depends on the required output and the operating speed range. The required output is often fixed. The size and weight of accessories is therefore a function of the operating speed range.

Increasing the operating speed of internal combustion engine accessories makes it possible to design accessories that are smaller in overall size and have less weight. The size and weight of engine accessories is a critical factor in efforts to reduce vehicle weight and to improve vehicle efficiency.

Two-speed alternator drives are known. U.S. Pat. No. 4,862,770 to Smith discloses a two-speed alternator drive which works well. The Smith patent is owned by the assignee of this invention. The metal gears employed in known two-speed engine accessory drives are expensive to manufacture, heavy, and can be noisy. All of these problems are magnified as operating speeds increase.

SUMMARY OF THE INVENTION

An object of this invention is to provide a two-speed transmission for driving internal combustion engine accessories at high speeds.

Another object of the invention is to provide a two-speed transmission for driving internal combustion engine accessories that produce minimal noise.

A further object of the invention is to provide a two-speed transmission for driving internal combustion engine accessories that is light weight.

A still further object of the invention is to provide a two-speed transmission, for driving internal combustion engine accessories, that has high durability and a long useful life.

The two-speed transmission for driving an internal combustion engine accessory has an enclosed gear case that is mounted directly on an accessory that is to be driven. The gear case has a central axis which is concentric with the axis of rotation of the accessory drive shaft. An input shaft is rotatably journaled in the gear case for rotation about the central gear case axis. A drive input pulley is attached to an end of the input shaft that extends outside the gear case. The drive input pulley is driven by a belt drive that is trained around a pulley on the engine crankshaft. The input drive pulley could be a gear that is in mesh, directly or indirectly, with a gear attached to the engine crankshaft. A drive sun gear is on the end of the input shaft inside the gear case. The drive sun gear can be an integral part of the input shaft or it can be a separate gear that is secured to the input shaft.

A planet gear carrier is mounted inside the gear case for rotation about an axis that is concentric with the central axis of the gear case. A passage is provided in the rear wall of the gear case and through the planet gear carrier that is concentric with the central gear case axis. A pair of bearings and a one-way clutch are mounted in the passage in the planet carrier. A driven sun gear with a central bore is positioned inside the gear case adjacent to the drive sun gear. The central bore of the driven sun gear is adapted to receive an accessory drive shaft when the gear box is mounted on the accessory. The accessory drive shaft passes through the passage in the rear wall of the gear case, through the two bearings and the one-way clutch mounted in the passage in the planet carrier and into the central bore in the driven sun gear. The driven sun gear and the accessory drive shaft have cooperating splines which insure that the accessory drive shaft rotates when the driven sun gear rotates.

Four planet gear support shafts are secured to the planet gear carrier at positions spaced equally from the central gear case axis. A compound planet gear is rotatably supported by each planet gear support shaft. Each compound planet gear includes a metal insert with a bore for receiving a planet gear support shaft and a first and second integral plastic gears molded to the outside of the metal inserts. The first plastic gear of each compound planet gear meshes with the drive sun gear and the second integral plastic gear meshes with the driven sun gear.

The planet gear carrier has an outer cylindrical surface. A brake band encompasses the outer cylindrical surface of the planet gear carrier. A brake actuator is mounted on the gear case and attached to the brake band. The brake actuator is operable to tighten the brake band on the outer cylindrical surface and thereby prevent rotation of the planet gear carrier. The brake actuator is also operable to release the brake band and let the planet gear carrier rotate.

Activation of the brake actuator to tighten the brake band holds the planet gear carrier from rotation. When the planet gear carrier is held, to prevent rotation relative to the gear case, input torque is transmitted from the input shaft, to the drive sun gear, to the first integral plastic gear, to the second integral plastic gear, to the driven sun gear and to an accessory drive shaft. The accessory drive shaft is driven at a higher speed than the input shaft.

Activation of the brake actuator to loosen the brake band will allow the planet gear carrier to rotate relative to the gear case. The one-way clutch in the passage through the planet gear carrier will engage the accessory drive shaft to insure that the accessory drive shaft rotates with the planet gear carrier. Upon engagement of the one-way clutch, the planet carrier becomes locked and the accessory drive shaft rotates at the same speed as the input shaft.

The foregoing and other objects, features and advantages of the present invention will become apparent in the light of the following detailed description of an exemplary embodiment thereof, as illustrated in the accompanying drawing.

DESCRIPTION OF THE PREFERRED EMBODIMENT

Figure 2:
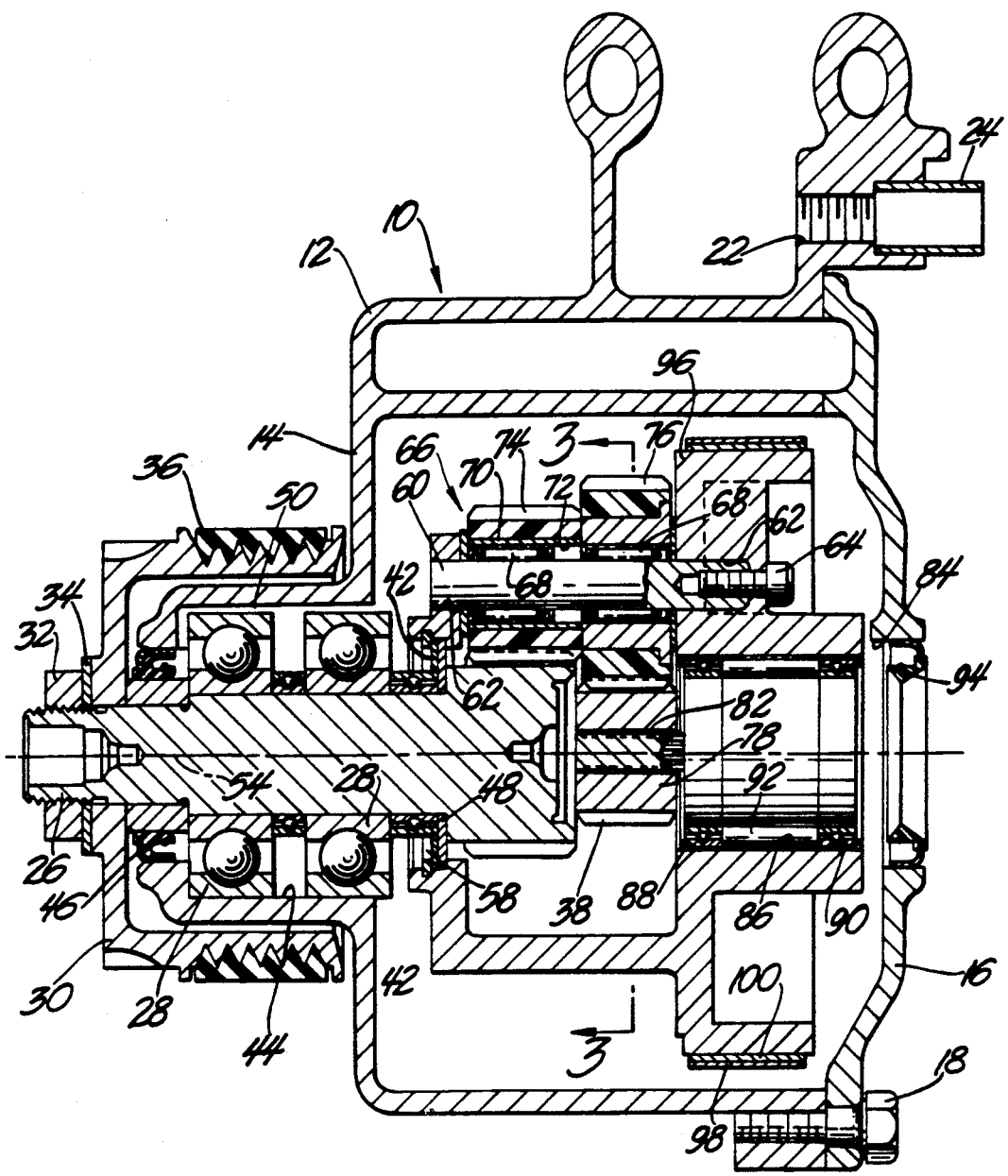
FIG. 2 is a sectional view taken along line 2—2 in FIG. 1.

The two speed transmission 10 for driving an internal combustion engine accessory has a gear case 12. The gear case 12 includes a front section 14 and a rear cover plate 16 secured to the front section by bolts 18. The gear case 12 includes several projections 20 with threaded apertures 22. At least two of the apertures 22 receive hollow dowel pins 24, one of which is shown in FIG. 2. The hollow dowel pins 24 enter apertures in an engine accessory to align the gear case 12 relative to the engine accessory. Bolts are then screwed into the threaded apertures 22 to secure the gear case 12 to the accessory.

Figure 1:
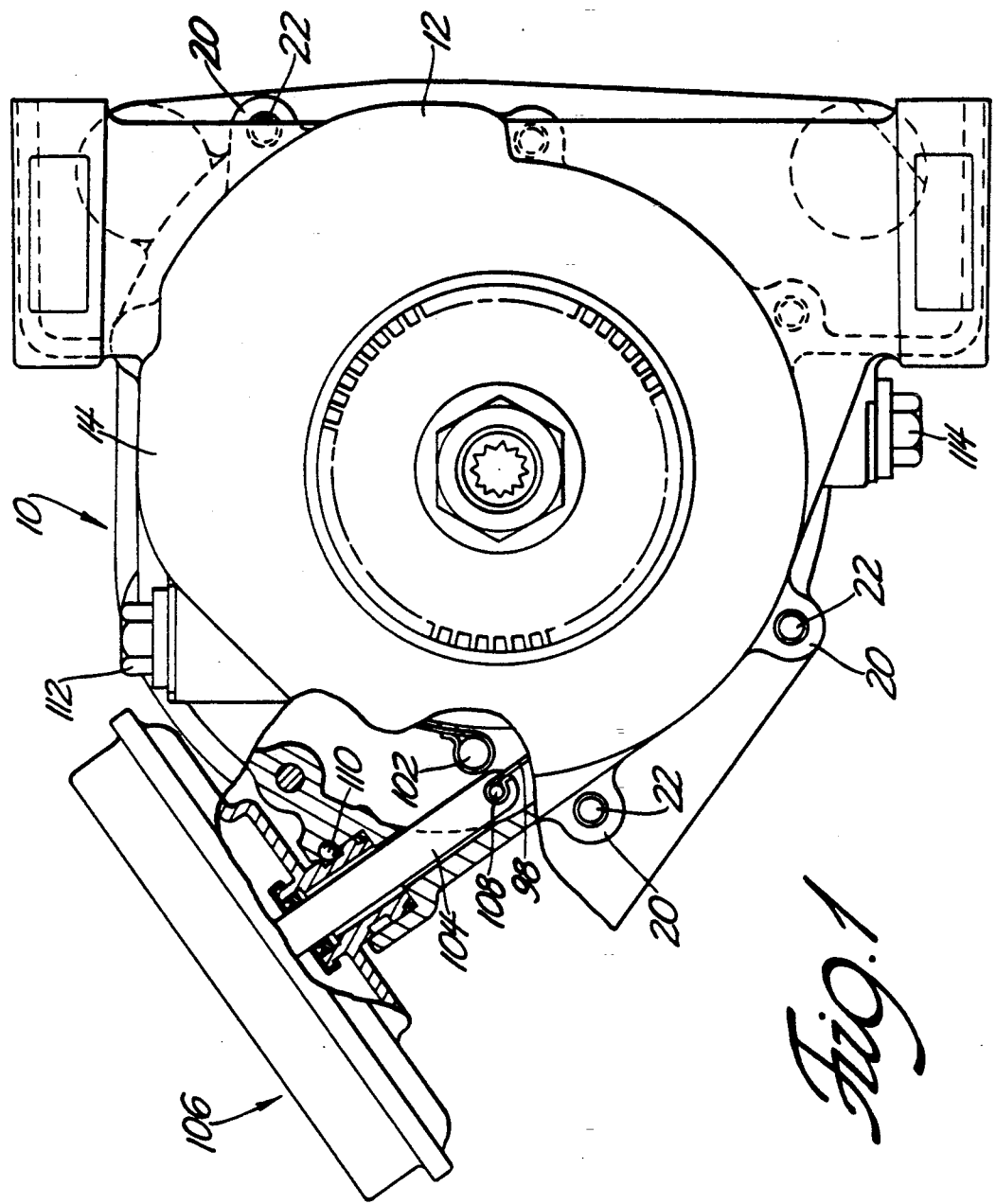
FIG. 1 is a front view of the two-speed vehicle engine accessory drive with parts broken away to show the brake actuator

An input shaft 26 is rotatably mounted in the front section 14 of the gear case 12 by a pair of bearings 28. The forward end of the input shaft 26 has an input shaft drive pulley 30 attached by a nut 32 and washer 34. The drive pulley 30, shown in FIGS. 1 and 2, is driven by a power band belt 36 that is trained around a pulley on the crankshaft of an internal combustion engine. The drive pulley 30 could be replaced by a conventional v-belt pulley, by a gear, or by other drive systems. A gear on the input shaft 26 could be driven by a gear on the crankshaft of an internal combustion engine. A gear drive would normally include one or more gears between the gear on the crankshaft and the gear on the input shaft 26. Gear drives are frequently used when high reliability and low maintenance are required.

An input drive sun gear 38 is an integral portion of the end of the input shaft 26 inside the gear case 12. The input drive sun gear 38 could be a separate gear secured to the input shaft 26 if desired. The input drive sun gear 38 is preferably a steel gear but could be made from other suitable material.

Spacers 40 and 42 are provided on the input shaft 26 to hold the bearings 28 in the proper position in the bore 44 in the front section 14 of the gear case 12. A front seal assembly 46 seals the opening in the front section 14 where the input shaft 26 extends out of the gear case 12. The front seal assembly keeps lubricating and cooling fluid in the gear case 12 and keeps foreign material out. An input shaft thrust washer 48 is also placed on the input shaft 26. A lubricant passage 50 is provided in the bore 44 to improve the circulation of fluid for lubricating and cooling the bearings 28.

A planet gear carrier 52 is mounted inside the gear case 12 for rotation about an axis that is concentric with the central gear case axis 54 and the axis of rotation of the input shaft 26 and the input drive sun gear 38. Axial movement between the planet gear carrier 52 and the input drive sun gear 38 is limited by a planet carrier thrust washer 56 that contacts the input shaft thrust washer 48 and the spacer 42 and is held in the planet gear carrier 52 by a snap ring 58.

Figure 3:
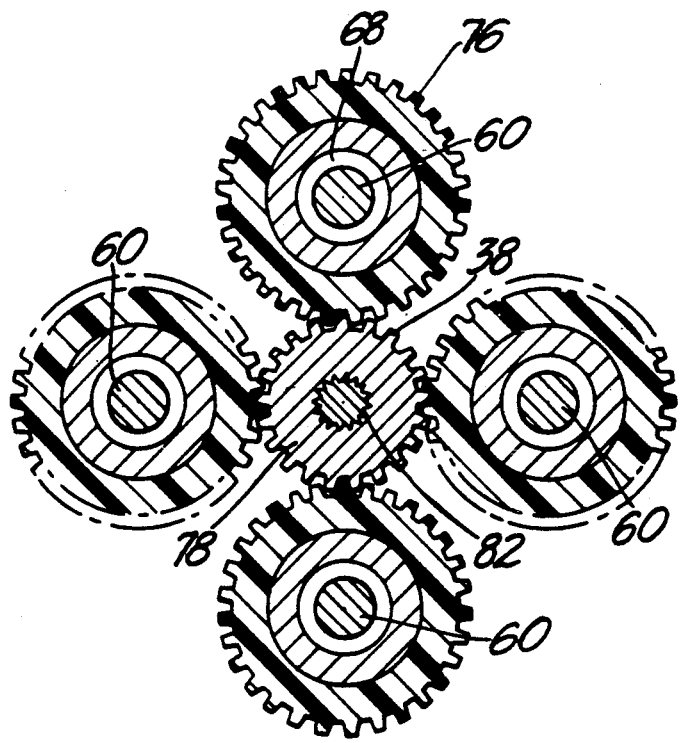
FIG. 3 is a sectional view of the planet gear carrier and the driven sun gear taken along line 3—3 in FIG. 2.
Figure 4:
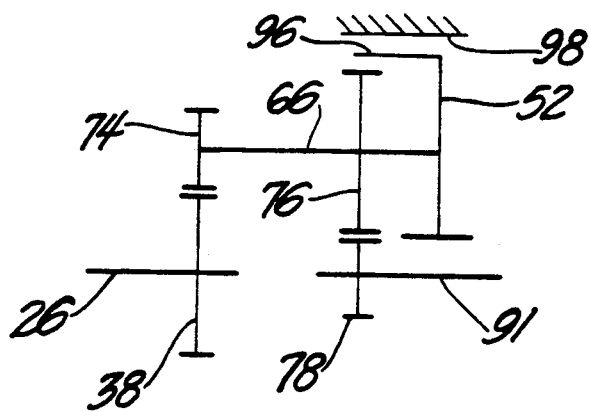
FIG. 4 is a schematic showing the drive train employed in the two speed transmission.

Four planet gear support shafts 60 are secured in bores 62 in the planet gear carrier 52 by bolts 64. The planet gear support shafts 60 have axies that are parallel to and equally spaced from the central gear case axis 54. As shown in FIG. 3, the four planet gear support shafts 60 are also spaced from each other equal distances. Equal spacing is not necessary. However, they should be spaced so that the planet gear carrier 52 is balanced. There could be two or three planet gear support shafts 60 rather than four, as shown in the drawing, depending on the torque required to drive the accessory.

A compound planet gear 66 is rotatably journaled on each planet gear support shaft 60 by a pair of needle bearings 68. Each compound planet gear 66, as shown in the drawing, includes a rigid insert 70, made from steel or other rigid material, and having a bore 72 for receiving the needle bearings 68. It is possible to use solid plastic gears depending upon the non-metal gear material used and the application. A first plastic planet gear 74 is secured to the rigid insert 70. A second plastic planet gear 76 is also secured to the rigid insert 70. The first and second plastic planet gears 74 and 76 may be molded on the rigid insert 70 or attached by other appropriate procedures.

The first plastic planet gear 74 of each compound planet gear 66 meshes with the input drive sun gear 38. A driven sun gear 78 with a central bore 80 is positioned inside the planet gear carrier 52 adjacent to the input drive sun gear 38 and in mesh with all of the second plastic planet gears 76 of the compound planet gears 66. The central bore 80 of the driven sun gear 78, as shown in FIG. 3, includes splines 82. The splines 82 receive the splined accessory drive shaft (not shown) of the accessory to which the two speed transmission 10 is attached.

A passage 84, concentric with the central gear case axis 54, is provided in the gear case rear cover plate 16. A passage 86, which is also concentric with the central gear case axis 54, is provided in the rear portion of the planet gear carrier 52. A pair of bearings 88 and 90 are mounted in the passage 86 in the planet gear carrier. A one way clutch 92 is mounted in the passage 86 between the bearings 88 and 90. When the two speed transmission 10 is attached to an accessory, the accessory drive shaft 91, is inserted through the passage 84 in the gear case rear cover plate 16, through the bearing 90, the one way clutch 92 and the bearing 88 in the passage 86 in the planet gear carrier 52 and into the splines 82 in the driven sun gear 78. The hollow dowel pins 24 are inserted into apertures in the accessory to align the gear case 12 and the accessory and bolts are screwed into the threaded apertures 22 to secure the gear case 12 to the accessory. A rear seal 94 is provided in the passage 84 to seal the passage through which the accessory drive shaft extends into the gear case 12.

The driven sun gear 78, as shown in the drawing, has an outside diameter which would allow passage through the bearing 88, the one-way clutch 92, the bearing 90 and the rear seal 94. It would, therefore, be possible to place the driven sun gear 78 on an accessory drive shaft and then mount the two speed transmission 10 on the accessory.

An outer cylindrical surface 96 on the planet gear carrier 52 serves as a brake surface. A brake band 98 and attached friction material 100 encompasses the outer cylindrical surface 96. One end of the brake bank 98 is attached to a stationary pin 102, as shown in FIG. 1. The other end of the brake band 98 is attached to the actuator rod 104 of a brake actuator assembly 106 by a pin 108. The brake actuator assembly 106, as shown, is vacuum motor and is attached to the gear case 12 by a pin 110. When the brake actuator assembly 106 is activated to apply tension to the brake band 98, the planet gear carrier 52 is held in a fixed position relative to the gear case 12. When the brake actuator assembly 106 is activated to release tension on the brake band 98, the planet gear carrier 52 can rotate about the central gear case axis 54.

In operation with the brake actuator assembly 106 applying tension to the brake band 98, the planet gear carrier 52 is held stationary and the drive sun gear 38 rotates all of the compound planet gears 66 on the stationary planet gear support shafts 60. The second plastic planet gears 76, which rotate at the same number of revolutions per minute as the integral first plastic planet gears 74 drive the driven sun gear 78 and the accessory drive shaft to which it is attached at a higher speed than the input shaft 26. The two speed transmission is designed to drive the driven sun gear 78 at speeds of up to 20,000 revolutions per minute.

Releasing tension on the brake band 98, as explained above, will allow the planet gear carrier 52 to rotate. Rotation of the planet gear carrier 52 in the driven direction at a higher rate of speed than an accessory drive shaft will cause the one-way clutch 92 to engage the accessory drive shaft and lock the accessory drive shaft to the planet gear carrier 52. In this condition, the input shaft 26, the driven sun gear 78 and an accessory input shaft connected to the driven sun gear 78 by splines will all rotate at the same speed.

The employment of non-metallic gear teeth, on the compound planet gears 66 makes the two speed transmission 10 described above possible. When gear teeth come into contact, there is an impact. The grater the velocity at the pitch circle of the gears the greater the impact. The noise that results from gear teeth coming into contact at high speed will render some transmissions unacceptable. The noise problem can be reduced by improving manufacturing accuracy. Unfortunately the cost of improved manufacturing accuracy could render the transmission unacceptable.

The excessive noise problem can be reduced by using helical gears rather than spur gears. Helical gears produce axial thrust loads which require thrust bearings. Helical gears are more expensive to machine than spur gears. Molded plastic helical gears can be formed for about the same cost as molded plastic spur gears. Molded plastic helical gears have the high contact ratios of all helical gears and in addition have the advantages of plastic gears.

The use of non-metallic gears for the compound planet gear 66 reduces the noise levels, reduces cost and provide other significant advantages. Non-metallic gear teeth deflect more easily, promoting load sharing between the compound planet gears 66. The high dimensional accuracy of non-metallic gears combined with load sharing between the teeth on each gear increase the contact ratio. The increased contact ration reduces peak loads on individual gear teeth, and reduces the noise generated by the two speed transmission 10 at high speeds to acceptable levels. Helical gears and thrust washers may be advantageous for some applications.

Non-metallic gears reduce weight and also reduce inertia. Inertia in a transmission can cause large momentary tooth loads during speed changes. By reducing the momentary tooth loads during speed changes and reducing the weight of the compound planet gears 66, the size and weight of all components in the transmission including the bearings can be reduced.

Hysteresis heating can result from gear teeth deflection at high speed. The gear case 12 serves as an oil reservoir to provide lubrication and cooling. An oil fill plug 112 and an oil drain plug 114 are provided in the gear case 12.

The preferred embodiment of the invention has been described in detail but is an example only and the invention is not restricted thereto. It will be easily understood by those skilled in the art that modifications and variations can easily be made within the scope of this invention.

We claim:

1. A two speed transmission for driving an internal combustion engine accessory including a gear case; mounting means for mounting the gear case on the accessory to be driven; an input shaft rotatably journaled in the gear case for rotation about a central gear case axis; a drive sun gear attached to the input shaft inside the gear case; a planet gear carrier mounted in the gear case for rotation about the central gear case axis; a passage in the gear case and through the planet gear carrier that is concentric with the central gear case axis; a bearing and a one way clutch mounted in the passage in the planet gear carrier; a driven sun gear with a central bore positioned inside the gear case adjacent to the drive sun gear and wherein the central bore is adapted to non-rotatably receive an accessory drive shaft that passes through the passage in the gear case, through the one way clutch and the bearing mounted in the passage in the planet gear carrier and into the bore in the driven sun gear; four planet gear support shafts secured to the planet gear carrier and spaced from the central gear case axis, a compound planet gear including a metal insert and first and second integral plastic gears secured to the outside of the metal insert, rotatably journaled on each planet gear support shaft with the first integral plastic gear of each compound planet gear in mesh with the drive sun gear and the second integral plastic gear in mesh with the driven sun gear; an outer cylindrical surface on the planet gear carrier; a brake band mounted inside the gear case and encompassing the outer cylindrical surface of the planet gear carrier; and a brake actuator mounted on the gear case, attached to the brake band and operable to hold the planet gear carrier in a fixed position relative to the gear case or to allow the planet gear carrier to rotate relative to the gear case whereby said accessory drive shaft is driven by the one way clutch or by the driven sun gear.

2. The two speed transmission of claim 1 wherein the drive sun gear, the driven sun gear and the compound planet gears are spur gears.

3. The two speed transmission of claim 1 wherein the drive sun gear, the driven sun gear and the compound planet gears are helical gears.

4. A two speed transmission including a gear case; mounting means for mounting the gear case on a driven device; an input shaft rotatably journaled in the gear case for rotation about a central gear case axis; a drive sun gear attached to the input shaft inside the gear case;

a planet gear carrier mounted in the gear case and rotatable about the central gear case axis; a passage into the gear case and a portion of the planet gear carrier that is concentric with the central gear case axis; a one way clutch mounted in the passage into the planet gear carrier; a driven sun gear positioned inside the gear case adjacent to the drive sun gear and rotatable about the central gear case axis; a planet gear support shaft secured to the planet gear carrier; a compound planet gear rotatably journaled on the planet gear support shaft with a first integral gear with non-metallic teeth in mesh with the drive sun gear and a second integral gear with nonmetallic teeth in mesh with the driven sun gear; brake means mounted in the gear case and operable to hold the planet carrier in a fixed position relative to the gear case; and wherein the passage into the gear case that is concentric with the central gear case axis is operable to receive an accessory drive input shaft that is driven by the one way clutch or by the driven sun gear.

5. The two speed transmission of claim 4 wherein the drive sun gear, the driven sun gear and the compound planet gear are helical gears.

6. The two speed transmission of claim 4 wherein the drive sun gear, the driven sun gear and the compound planet gear are spur gears.

7. The two speed transmission of claim 4 wherein the brake means includes an outer cylindrical surface on the planet gear carrier, a brake band mounted inside the gear case and encompassing the outer cylindrical surface of the planet gear carrier and a brake actuator mounted on the gear case and attached to the brake band.

8. The two speed transmission of claim 4 including a plurality of planet gear support shafts secured to the planet carrier and a compound planet gear carrier rotatably journaled on each planet gear support shaft.

9. The two speed transmission of claim 8 wherein each compound planet gear includes a metallic tubular insert and two nonmetallic planet gears attached to the metallic tubular insert.

10. The two speed transmission of claim 8 wherein the drive sun gear, the driven sun gear and the compound planet gears are helical gears.

11. The two speed transmission of claim 8 wherein the drive sun gear, the driven sun gear and the compound planet gears are spur gears.

12. A two speed transmission for driving an internal combustion engine accessory including a gear case; mounting means for mounting the gear case on the accessory to be driven; an input shaft rotatably journaled in the gear case for rotation about a central gear case axis; a drive sun gear attached to the input shaft inside the gear case; a planet gear carrier mounted in the gear case for rotation about the central gear case axis; a passage in the gear case and through the planet gear carrier that is concentric with the central gear case axis; a bearing and a one way clutch mounted in the passage in the planet gear carrier; a driven sun gear with a central bore positioned inside the gear case adjacent to the drive sun gear and wherein the central bore is adapted to non-rotatably receive an accessory drive shaft that passes through the passage in the gear case, through the one way clutch and the bearing mounted in the passage in the planet gear carrier and into the bore in the driven sun gear; four planet gear support shafts secured to the planet gear carrier and spaced from the central gear case axis, a compound planet gear including a metal insert and first and second integral plastic gears secured to the outside of the metal insert, rotatably journaled on each planet gear support shaft with the first integral plastic gear of each compound planet gear in mesh with the drive sun gear and the second integral plastic gear in mesh with the driven sun gear; and brake means mounted in the housing and operable to hold the planet carrier in a fixed position relative to the gear case when the brake means is applied whereby said accessory drive shaft is driven by the one way clutch or by the driven sun gear.

* * * * *